United States Patent
Yu

(10) Patent No.: US 12,436,630 B2
(45) Date of Patent: Oct. 7, 2025

(54) ROLLER INPUT DEVICE HAVING A STOPPING MEMBER CONNECTED TO ROLLER SEAT

(71) Applicant: Chicony Electronics Co., Ltd., New Taipei (TW)

(72) Inventor: Wei-Chih Yu, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/771,048

(22) Filed: Jul. 12, 2024

(65) Prior Publication Data

US 2025/0060843 A1  Feb. 20, 2025

(30) Foreign Application Priority Data

Aug. 15, 2023 (TW) ................................. 112130714

(51) Int. Cl.
*G06F 3/0362* (2013.01)
*G06F 3/02* (2006.01)

(52) U.S. Cl.
CPC .......... *G06F 3/0362* (2013.01); *G06F 3/0202* (2013.01)

(58) Field of Classification Search
CPC .... A61K 38/00; C07K 14/045; C07K 16/085; C07K 16/089; C07K 16/40; C07K 2317/24; C07K 2317/34; C07K 4/02; C07K 7/06; C07K 7/08; G06F 3/0202; G06F 3/0362
See application file for complete search history.

(56) References Cited

U.S. PATENT DOCUMENTS

| | | | | |
|---|---|---|---|---|
| 5,530,455 | A * | 6/1996 | Gillick | G06F 3/0485 345/163 |
| 5,657,051 | A * | 8/1997 | Liao | G06F 3/03543 200/341 |
| 6,188,393 | B1 * | 2/2001 | Shu | G06F 3/0312 345/184 |
| 7,876,306 | B2 * | 1/2011 | Chiang | G06F 3/03543 345/163 |
| 11,797,106 | B1 * | 10/2023 | Fan | G06F 3/03543 |
| 2003/0076303 | A1 * | 4/2003 | Huppi | G06F 3/03543 345/157 |
| 2009/0002319 | A1 * | 1/2009 | Cheng | G06F 3/03543 345/163 |
| 2010/0141583 | A1 * | 6/2010 | Wu | G06F 3/0362 345/164 |
| 2022/0171473 | A1 * | 6/2022 | Chen | G06F 3/0312 |
| 2022/0342497 | A1 * | 10/2022 | Kao | H03K 17/965 |
| 2023/0028811 | A1 * | 1/2023 | Yu | H01H 13/85 |

* cited by examiner

*Primary Examiner* — Chun-Nan Lin
(74) *Attorney, Agent, or Firm* — Muncy, Geissler, Olds & Lowe, P.C.

(57) ABSTRACT

A roller input device includes a substrate, a bracket assembly, a roller seat, and a stopping member. The substrate has a top surface provided with a click button switch and a first tilt button switch. The bracket assembly and the roller seat are disposed on the substrate. The roller seat is pivotally connected to the bracket assembly. The stopping member is connected to the roller seat and has a first stopping portion. A first initial spacing is between the first stopping portion and the top surface. When the roller seat is at a pressing position, the first initial spacing is reduced to a first spacing being less than a first pressing stroke of the first tilt button switch. When the roller seat is at a first tilt position, the first initial spacing is reduced to a second spacing being less than a click pressing stroke of the click button switch.

12 Claims, 11 Drawing Sheets

ROLLER INPUT DEVICE HAVING A STOPPING MEMBER CONNECTED TO ROLLER SEAT

CROSS-REFERENCE TO RELATED APPLICATION

This non-provisional application claims priority under 35 U.S.C. § 119(a) to Patent Application No. 112130714 filed in Taiwan, R.O.C. on Aug. 15, 2023, the entire contents of which are hereby incorporated by reference.

BACKGROUND

Technical Field

The instant disclosure relates to an input device, in particular, to a roller input device.

Related Art

Commonly, computers are used along with roller input devices. For example, the roller input device may be provided on a keyboard or a mouse, and the user can use the roller input device to perform actions, such as dragging item(s), scrolling pages, or switching menu(s).

SUMMARY

To meet users' diversified application requirements, in certain types of roller input devices, not only rotating and pressing operation can be performed on the roller, but also other operations can be performed on the roller; for example, the user can operate the roller to swing to perform different functions.

However, because the roller can be moved toward different directions, when the user improperly operates the roller so that the angle or the magnitude of the force applied to the roller is not proper, a malfunction of the roller may occur. For example, originally, the user is intended to operate the roller to swing; however, the user applies an excessive force to the roller to cause the roller not only swinging but also moving downward, thereby making a malfunction of the roller.

In view of this, in one embodiment, a roller input device is provided. The roller input device comprises a substrate, a bracket assembly, a roller seat, and a stopping member. The substrate has a top surface, the top surface is provided with a click button switch and a first tilt button switch, the click button switch has a click pressing stroke, and the first tilt button switch has a first pressing stroke. The bracket assembly is disposed on the substrate. The bracket assembly comprises a first bracket and a second bracket arranged apart from each other. The roller seat is disposed on the substrate and between the first bracket and the second bracket. The roller seat has a first end and a second end opposite to the first end. The first end is liftably and pivotally connected to the first bracket, the second end is pivotally connected to the second bracket, the click button switch is adjacent to the first end, and the roller seat selectively moves downward to a pressing position or swings to a first tilt position along a first side direction. The stopping member is connected to the roller seat. The stopping member has a first stopping portion, the first stopping portion and the first tilt button switch are at one side of the roller seat, and a first initial spacing is between the first stopping portion and the top surface of the substrate. When the roller seat is at the pressing position, the roller seat presses and triggers the click button switch, so that the first initial spacing is reduced to a first spacing, and the first spacing is less than the first pressing stroke of the first tilt button switch. When the roller seat is at the first tilt position, the roller seat presses and triggers the first tilt button switch, so that the first initial spacing is reduced to a second spacing, and the second spacing is less than the click pressing stroke of the click button switch.

Based on the above, in the roller input device according to one or some embodiments of the instant disclosure, when the roller seat is at the pressing position to press and trigger the click button switch, the spacing between the first stopping portion of the stopping member and the top surface of the substrate is reduced to be less than the first pressing stroke of the first tilt button switch, thereby preventing the roller seat from being swung to trigger the first tilt button switch mistakably; when the roller seat is at the first tilt position to press and trigger the first tilt button switch, the spacing between the first stopping portion of the stopping member and the top surface of the substrate is reduced to be less than the click pressing stroke of the click button switch, thereby preventing the roller seat from moving downward to trigger the click button switch mistakably. Accordingly, the malfunction of the roller input device caused by user's improper force application can be prevented.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, the same reference numbers refer to identical or similar elements.

Figure 1:
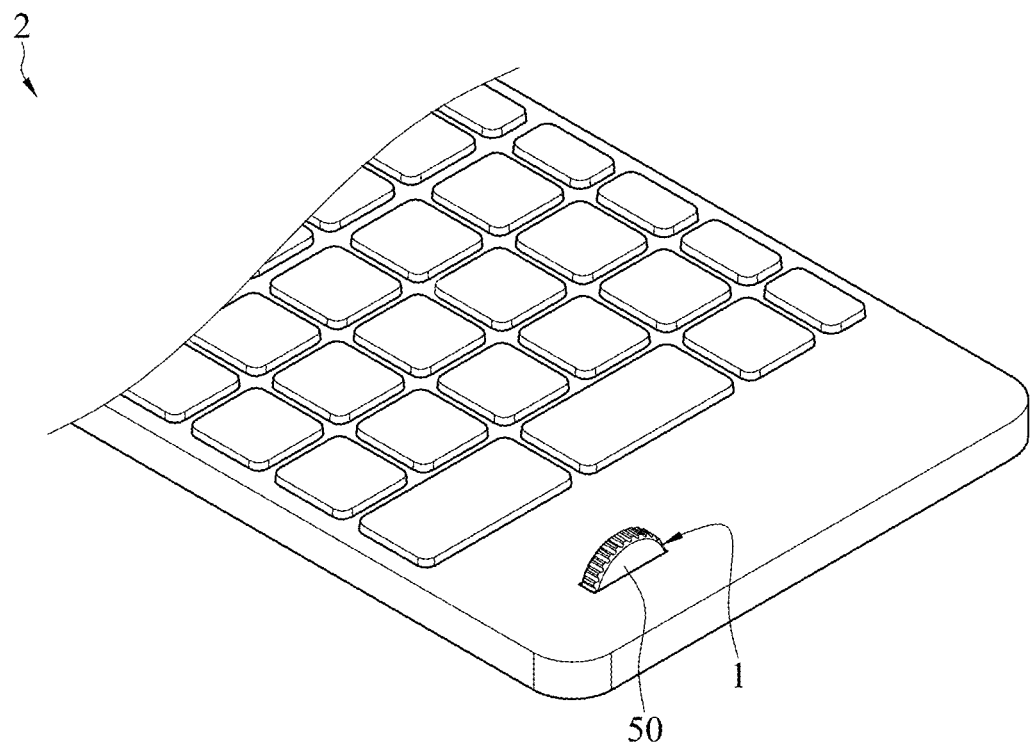
FIG. 1 illustrates an application schematic view of a roller input device according to an exemplary embodiment of the instant disclosure.
Figure 2:
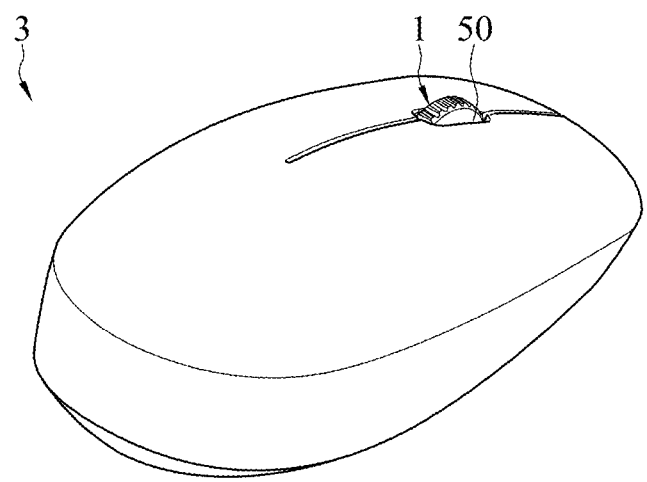
FIG. 2 illustrates an application schematic view of a roller input device according to another exemplary embodiment of the instant disclosure.
Figure 3:
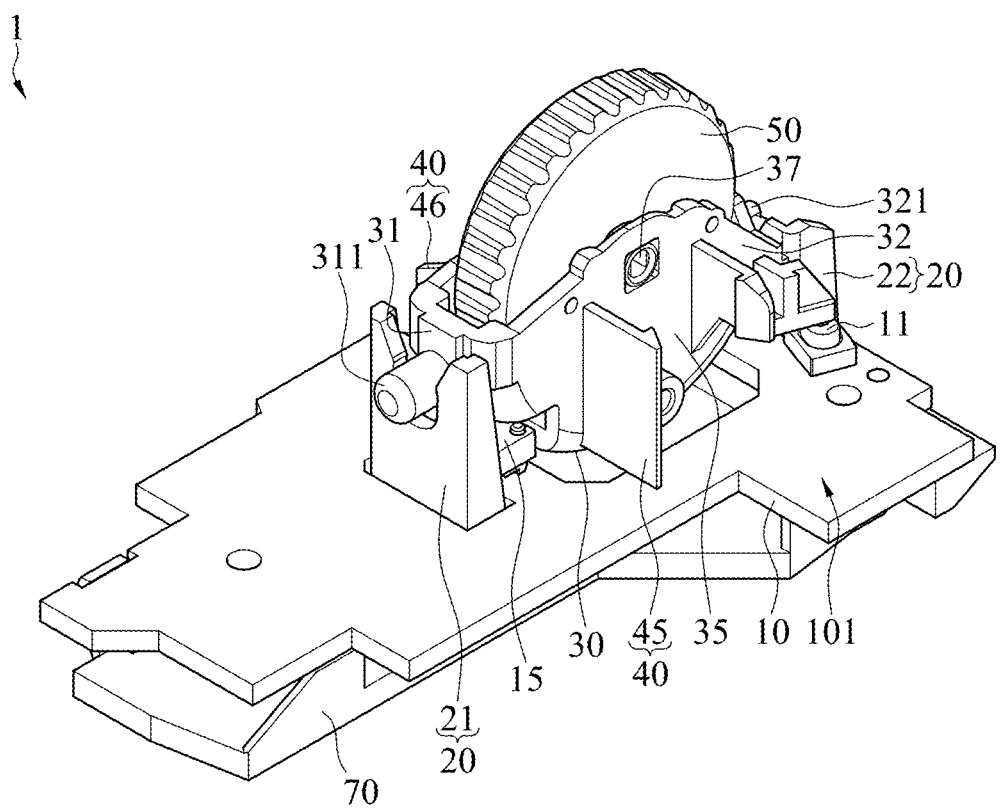
FIG. 3 illustrates a perspective view of a roller input device according to a first embodiment of the instant disclosure.

FIG. 1 illustrates an application schematic view of a roller input device according to an exemplary embodiment of the instant disclosure. FIG. 2 illustrates an application schematic view of a roller input device according to another exemplary embodiment of the instant disclosure. FIG. 3 illustrates a perspective view of a roller input device according to a first embodiment of the instant disclosure. As shown in FIG. 1 to FIG. 3, according to one or some embodiments of the instant disclosure, the roller input device 1 is an input device of a computer, and the roller input device 1 is adapted to manipulate the page shown on the computer to perform certain actions (such as dragging items, scrolling the page upward or downward, or switching menus). In some embodiments, the roller input device 1 may be applied to a keyboard 2 of the computer (as shown in FIG. 1). Alternatively, in some other embodiments, the roller input device 1 may be applied to a mouse 3 of the computer (as shown in FIG. 2); for example, the roller input device 1 may be assembled in the housing of the keyboard 2 or the housing of the mouse 3.

Figure 4:
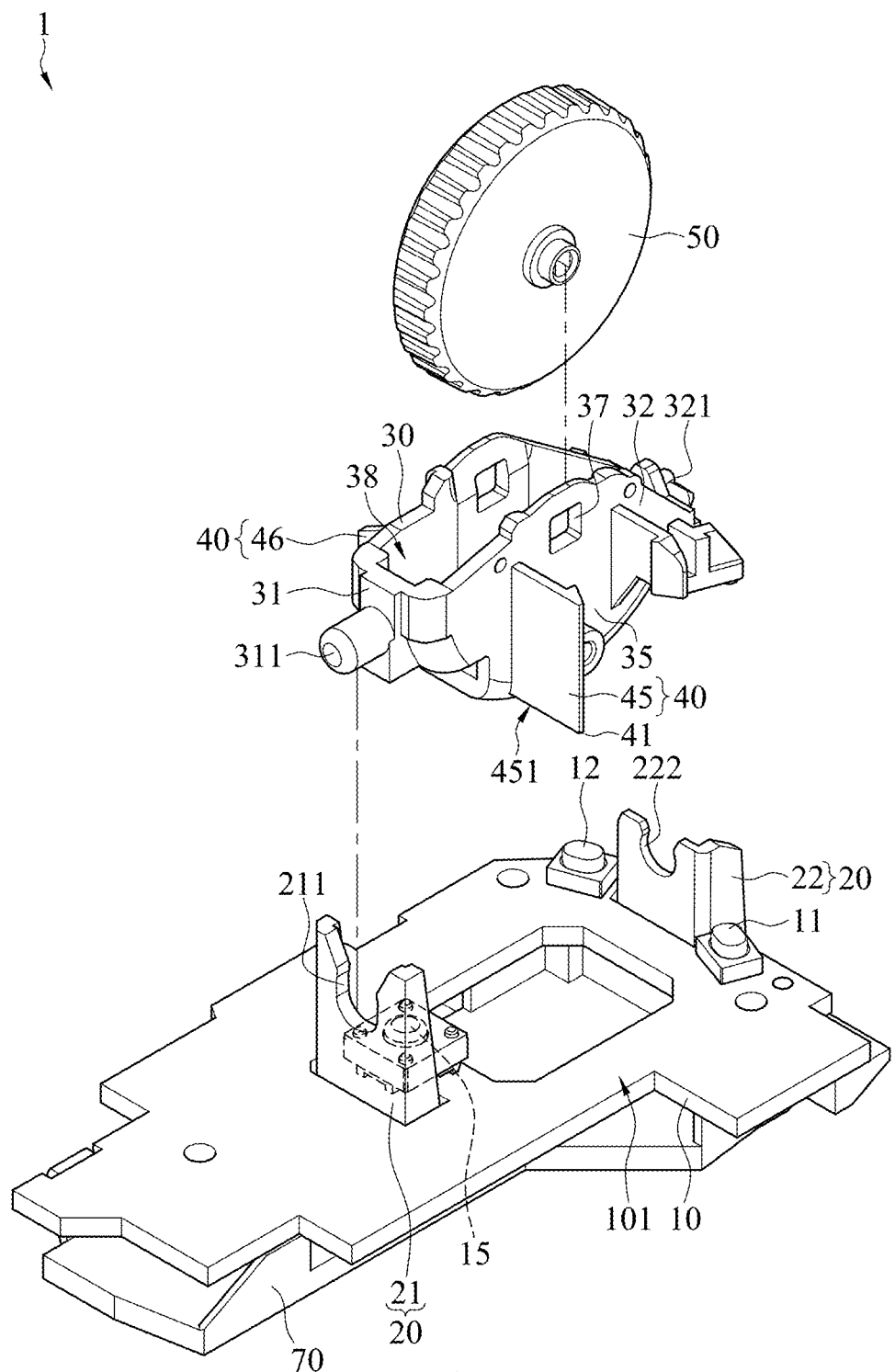
FIG. 4 illustrates an exploded view of the roller input device of the first embodiment of the instant disclosure.
Figure 5:
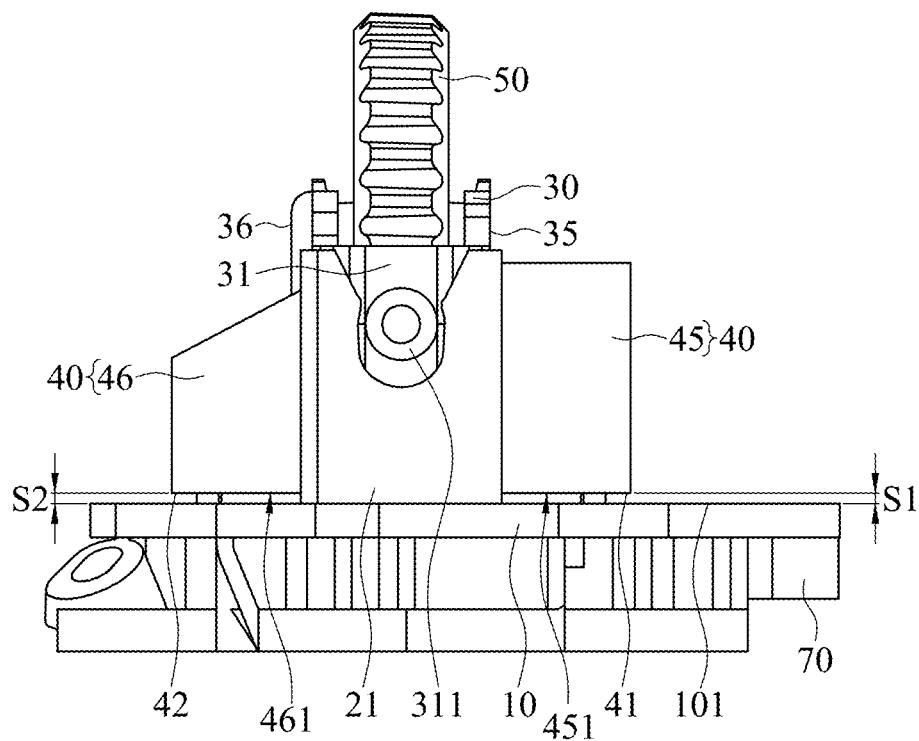
FIG. 5 illustrates a side view of the roller input device of the first embodiment of the instant disclosure.

FIG. 4 illustrates an exploded view of the roller input device of the first embodiment of the instant disclosure. FIG. 5 illustrates a side view of the roller input device of the first embodiment of the instant disclosure. As shown in FIG. 3 to FIG. 5, the roller input device 1 comprises a substrate 10, a bracket assembly 20, a roller seat 30, and a stopping member 40, where the bracket assembly 20, the roller seat 30, and the stopping member 40 are all disposed on the substrate 10.

As shown in FIG. 3 to FIG. 5, the substrate 10 has a top surface 101, the top surface 101 is provided with a click button switch 15 and at least one tilt button switch. In this embodiment, the top surface 101 of the substrate 10 is provided with two tilt button switches (the first tilt button switch 11 and the second tilt button switch 12). However, it is understood that, the number of the tilt button switch may be varied according to actual demands, and the instant disclosure is not limited thereto.

Moreover, the click button switch 15 has a click pressing stroke, the first tilt button switch 11 has a first pressing stroke, and the second tilt button switch 12 has a second pressing stroke. The click pressing stroke refers to the distance between the initial position of the click button switch 15 and the triggered position of the click button switch 15 where the click button switch 15 is pressed to be moved downward from the initial position. Likewise, the first pressing stroke refers to the distance between the initial position of the first tilt button switch 11 and the triggered position of the first tilt button switch 11 where the first tilt button switch 11 is pressed to be moved downward from the initial position, and the second pressing stroke refers to the distance between the initial position of the second tilt button switch 12 and the triggered position of the second tilt button switch 12 where the second tilt button switch 12 is pressed to be moved downward from the initial position. For example, the click pressing stroke, the first pressing stroke, and the second pressing stroke each may be 0.3 mm, 0.4 mm, or 0.5 mm, but the instant disclosure is not limited thereto.

In some embodiments, the substrate 10 may be a plate made of metal (e.g., iron, aluminum, and alloy) or plastic material. Alternatively, in some embodiments, the substrate 10 may be a circuit board, for example, the circuit board may be a membrane circuit board, a printed circuit board (PCB), a flexible print circuit board (FPCB), a rigid-flex PCB, or the like.

As shown in FIG. 3 to FIG. 5, the bracket assembly 20 is disposed on the substrate 10 and comprises a first bracket 21 and a second bracket 22, where the first bracket 21 and the second bracket 22 are arranged apart from each other. In this embodiment, the substrate 10 is fixed on a base 70, so that the substrate 10 can be further supported by the base 70. The first bracket 21 and the second bracket 22 are connected to the base 70, the substrate 10 has a plurality of holes, so that the first bracket 21 and the second bracket 22 respectively pass through the holes to be disposed on the substrate 10. In some embodiments, the bracket assembly 20 may be directly fixed on the top surface 101 of the substrate 10, but the instant disclosure is not limited thereto.

As shown in FIG. 3 to FIG. 5, the roller seat 30 is disposed on the substrate 10 and is adapted to be assembled with a roller 50, and the roller seat 30 is between the first bracket 21 and the second bracket 22. In this embodiment, the roller seat 30 is a hollow housing and has a groove 38, and the roller seat 30 has a pivoting portion 37 (for example, the pivoting portion 37 may be at least one shaft hole or shaft) adapted to be pivotally connected to the roller 50. In this embodiment, a portion of the roller 50 (in this embodiment, the lower portion of the roller 50) is in the groove 38, and a shaft of the roller 50 is pivotally connected to the pivoting portion 37 of the roller seat 30. Therefore, when the roller 50 is operated, the roller 50 can be rotated with respect to the roller seat 30. Moreover, as shown in FIG. 1 and FIG. 2, a portion of the roller 50 (in this embodiment, the upper portion of the roller 50) may be exposed from the housing of the keyboard 2 or the housing of the mouse 3 for user's operation.

As shown in FIG. 3 to FIG. 5, the roller seat 30 has a first end 31 and a second end 32 opposite to the first end 31. The first end 31 is liftably and pivotally connected to the first bracket 21, and the second end 32 is pivotally connected to the second bracket 22. In this embodiment, the first bracket 21 has a guide slot 211, and an extension direction of the guide slot 211 is perpendicular to an extension direction of the substrate 10. The first end 31 of the roller seat 30 has a first shaft 311 pivotally connected in the guide slot 211. Therefore, the first shaft 311 not only can be rotated with respect to the first bracket 21 but also can be moved upward and downward along the guide slot 211. The second bracket 22 has a shaft hole 222, the second end 32 of the roller seat 30 has a second shaft 321, and the second shaft 321 is pivotally connected in the shaft hole 222. Therefore, the second shaft 321 can be rotated with respect to the second bracket 22. Accordingly, in some embodiments, the roller seat 30 can selectively swing or move upward/downward with respect to the bracket assembly 20 through the first shaft 311 and the second shaft 321.

As shown in FIG. 3 to FIG. 5, the click button switch 15 is adjacent to and adapted to abut against the first end 31 of the roller seat 30, so that the roller seat 30 can be retained at a predetermined height position, and the first tilt button switch 11 and the second tilt button switch 12 are respectively at two opposite sides of the roller seat 30. In this embodiment, the first tilt button switch 11 and the second tilt button switch 12 are both adjacent to the second end 32 of the roller seat 30. Therefore, the user can operate the roller 50 and the roller seat 30 to swing or move upward/downward with respect to the substrate 10, so that the roller seat 30 can selectively move downward and toward the substrate 10 to a pressed position to press the click button switch 15, swing to a first tilt position along a first side direction to press the first tilt button switch 11, or swing to a second tilt position along a second side direction opposite to the first side direction to press the second tilt button switch 12. Therefore, different signals and functions can be provided by the roller input device 1.

As shown in FIG. 3 to FIG. 5, the stopping member 40 may be a plate, a block, or a bracket connected to the roller seat 30. The stopping member 40 may be integrally connected to the roller seat 30 or may be detachably connected to the roller seat 30, so that the stopping member 40 can be moved along with the movement of the roller seat 30. In this embodiment, the stopping member 40 has a first stopping portion 41 and a second stopping portion 42. The first stopping portion 41 and the first tilt button switch 11 are at one of two sides of the roller seat 30, and the second stopping portion 42 and the second tilt button switch 12 are at the other side of the roller seat 30.

Moreover, in this embodiment, the stopping member 40 comprises a first plate member 45 and a second plate member 46, the roller seat 30 has a first side surface 35 and a second side surface 36 opposite to the first side surface 35, the first plate member 45 integrally extends from the first side surface 35 of the roller seat 30, and the second plate member 46 integrally extends from the second side surface 36 of the roller seat 30. The first plate member 45 has a first bottom surface 451 facing the substrate 10, the first stopping portion 41 is at one end of the first bottom surface 451 away from the first side surface 35, the second plate member 46 has a second bottom surface 461 facing the substrate 10, and the second stopping portion 42 is at one end of the second bottom surface 461 away from the second side surface 36. Therefore, through that the first plate member 45 and the second plate member 46 of the stopping member 40 integrally extend from the roller seat 30, the structural strength of the assembly of the stopping member 40 and the roller seat 30 can be enhanced, thereby preventing the stopping member 40 from being deformed or broken when a force is applied on the stopping member 40.

As shown in FIG. 3 to FIG. 5, when the roller seat 30 is not operated by the user yet, a first initial spacing S1 is between the first stopping portion 41 of the stopping member 40 and the top surface 101 of the substrate 10, and a second initial spacing S2 is between the second stopping portion 42 of the stopping member 40 and the top surface 101 of the substrate 10, where each of the first initial spacing S1 and the second initial spacing S2 is greater than or equal to the click pressing stroke, greater than or equal to the first pressing stroke, and greater than or equal to the second pressing stroke. For example, supposed that the click pressing stroke, the first pressing stroke, and the second pressing stroke are all 0.3 mm, each of the first initial spacing S1 and the second initial spacing S2 is greater than or equal to 0.3 mm.

Figure 6:
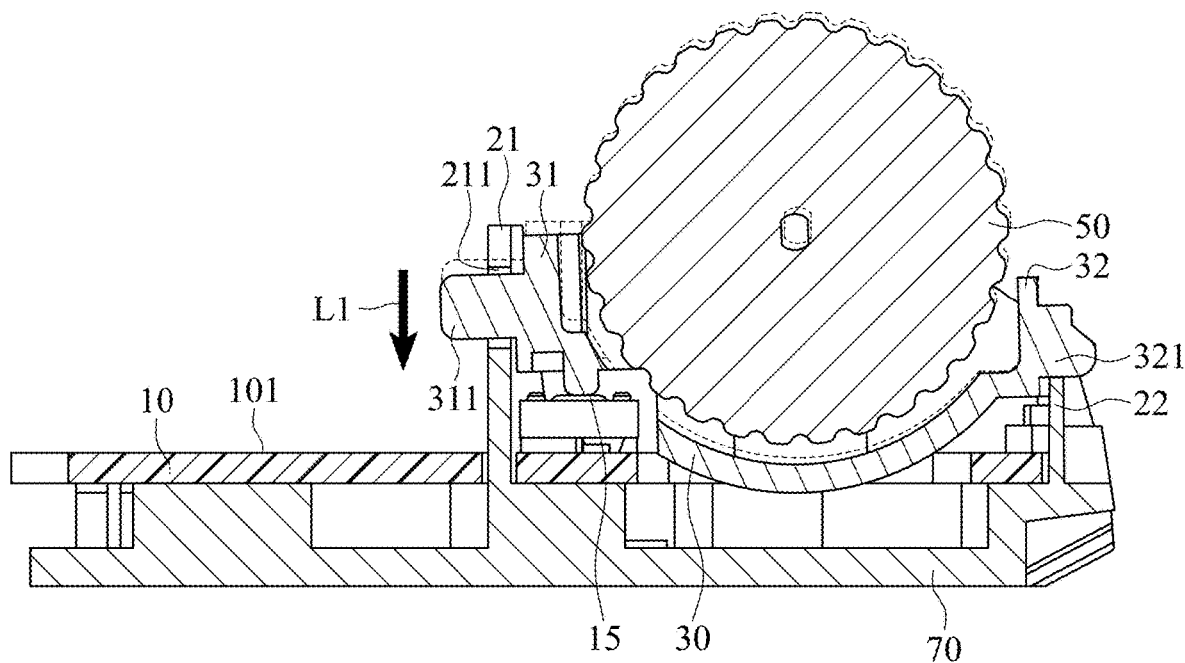
FIG. 6 illustrates a cross-sectional view of a roller seat of a roller input device according to an exemplary embodiment of the instant disclosure, where the roller seat is at a pressing position.
Figure 7:
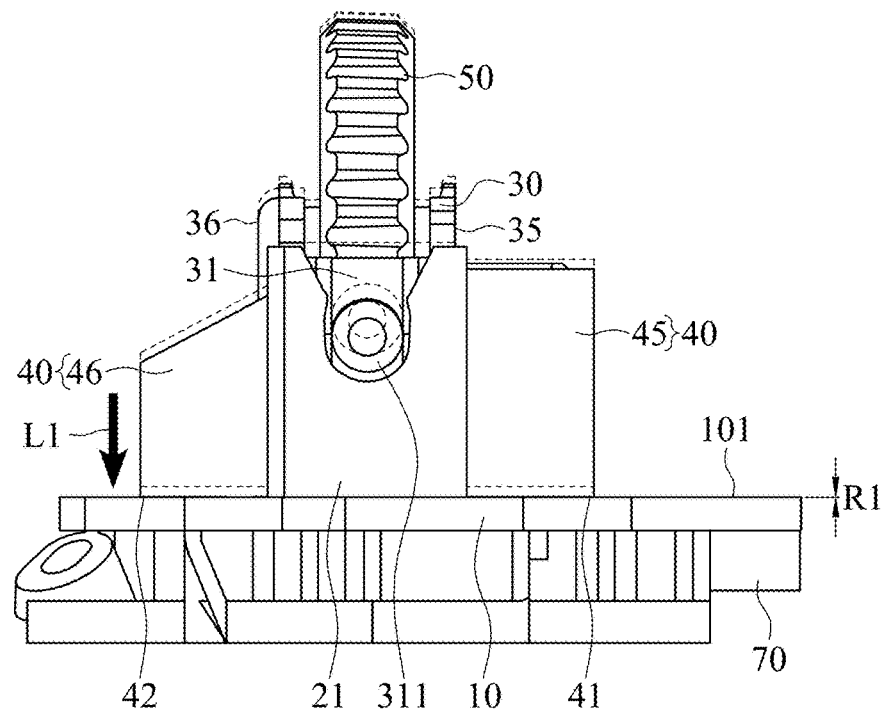
FIG. 7 illustrates a side view of the roller seat of the roller input device of the exemplary embodiment, where the roller seat is at the pressing position.

FIG. 6 illustrates a cross-sectional view of a roller seat of a roller input device according to an exemplary embodiment of the instant disclosure, where the roller seat is at a pressing position. FIG. 7 illustrates a side view of the roller seat of the roller input device of the exemplary embodiment, where the roller seat is at the pressing position. As shown in FIG. 6 and FIG. 7, when the roller seat 30 is pressed by the user to move downward (as indicated by the arrow L1) and toward the pressed position, the click button switch 15 is pressed to have the click pressing stroke. Therefore, the roller seat 30 presses and triggers the click button switch 15, and the stopping member 40 moves toward the top surface 101 of the substrate 10 along with the downward movement of the roller seat 30. Hence, the first initial spacing S1 and the second initial spacing S2 (as shown in FIG. 5) are reduced to a first spacing R1, where the first spacing R1 is less than the first pressing stroke of the first tilt button switch 11, and the first spacing R1 is less than the second pressing stroke of the second tilt button switch 12. For example, supposed that the first pressing stroke of the first tilt button switch 11 and the second pressing stroke of the second tilt button switch 12 are both 0.3 mm, the first spacing R1 is less than 0.3 mm (e.g., the first spacing R1 may be 0.2 mm, 0.1 mm, or 0 mm). Therefore, when the roller seat 30 moves downward to trigger the click button switch 15, the roller seat 30 is limited by the first stopping portion 41 and the second stopping portion 42 of the stopping member 40 and thus cannot swing. In some embodiments, even if the roller seat 30 is not fully limited by the first stopping portion 41 and the second stopping portion 42 of the stopping member 40 and thus can swing, the roller seat 30 is stopped by the first stopping portion 41 (or the second stopping portion 42) and thus cannot trigger the first tilt button switch 11 (or the second tilt button switch 12). Therefore, the condition that the user mistakably triggers the first tilt button switch 11 (or the second tilt button switch 12) caused by improper force application can be prevented.

Figure 8:
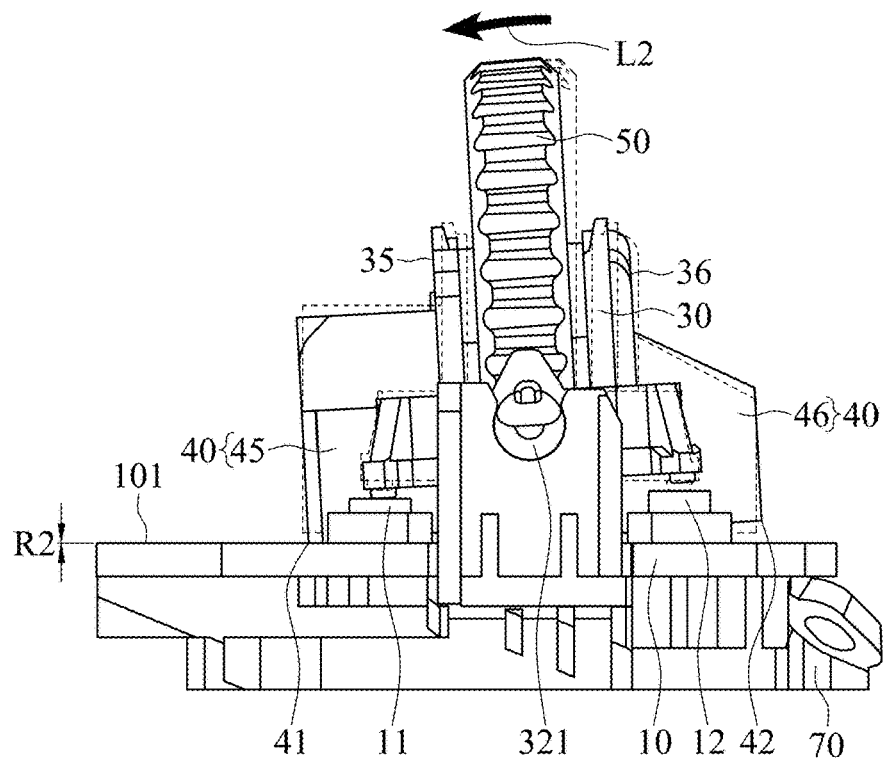
FIG. 8 illustrates a side view of the roller seat of the roller input device of the exemplary embodiment, where the roller seat is at a first tilt position.

FIG. 8 illustrates a side view of the roller seat of the roller input device of the exemplary embodiment, where the roller seat is at a first tilt position. As shown in FIG. 8, when the roller seat 30 is operated by the user to swing to the first tilt position along the first side direction (as indicated by the arrow L2), the first tilt button switch 11 is pressed to have the first pressing stroke. Therefore, the roller seat 30 presses and triggers the first tilt button switch 11, and the first stopping portion 41 of the stopping member 40 moves toward the top surface 101 of the substrate 10 along with the swinging movement of the roller seat 30. Hence, the first initial spacing S1 (as shown in FIG. 5) is reduced to a second spacing R2, where the second spacing R2 is less than the click pressing stroke of the click pressing stroke. For example, supposed that the click pressing stroke of the click button switch is 0.3 mm, the second spacing R2 is less than 0.3 mm (e.g., the second spacing R2 may be 0.2 mm, 0.1 mm, or 0 mm). Therefore, when the roller seat 30 triggers the first tilt button switch 11, the roller seat 30 is limited by the first stopping portion 41 of the stopping member 40 and thus cannot be moved downward. In some embodiments, even if the roller seat 30 is not fully limited by the first stopping portion 41 of the stopping member 40 and thus can move downward, the roller seat 30 is stopped by the first stopping portion 41 and thus cannot trigger the click button switch 15. Therefore, the condition that the user mistakably triggers the click button switch 15 caused by improper force application can be prevented.

Figure 9:
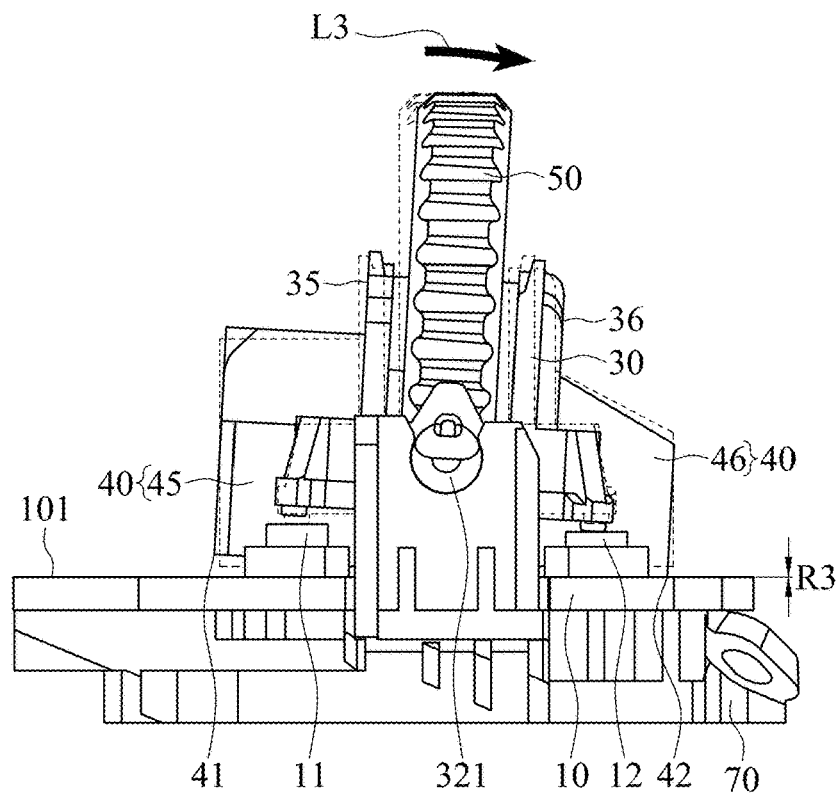
FIG. 9 illustrates a side view of the roller seat of the roller input device of the exemplary embodiment, where the roller seat is at a second tilt position.

FIG. 9 illustrates a side view of the roller seat of the roller input device of the exemplary embodiment, where the roller seat is at a second tilt position. As shown in FIG. 9, likewise, when the roller seat 30 is operated by the user to swing to the second tilt position along the second side direction (as indicated by the arrow L3), the second tilt button switch 12 is pressed to have the second pressing stroke. Therefore, the roller seat 30 presses and triggers the second tilt button switch 12, and the second stopping portion 42 of the stopping member 40 moves toward the top surface 101 of the substrate 10 along with the swinging movement of the roller seat 30. Hence, the second initial spacing S2 (as shown in FIG. 5) is reduced to a third spacing R3, where the third spacing R3 is less than the click pressing stroke of the click button switch 15. For example, supposed that the click pressing stroke of the click button switch is 0.3 mm, the third spacing R3 is less than 0.3 mm (e.g., the third spacing R3 may be 0.2 mm, 0.1 mm, or 0 mm). Therefore, when the roller seat 30 triggers the second tilt button switch 12, the roller seat 30 is limited by the second stopping portion 42 of the stopping member 40 and thus cannot be moved downward. In some embodiments, even if the roller seat 30 is not fully limited by the second stopping portion 42 of the stopping member 40 and thus can swing, the roller seat 30 is stopped by the second stopping portion 42 and thus cannot trigger the click button switch 15. Therefore, the condition that the user mistakably triggers the click button switch 15 caused by improper force application can be prevented.

Figure 10:
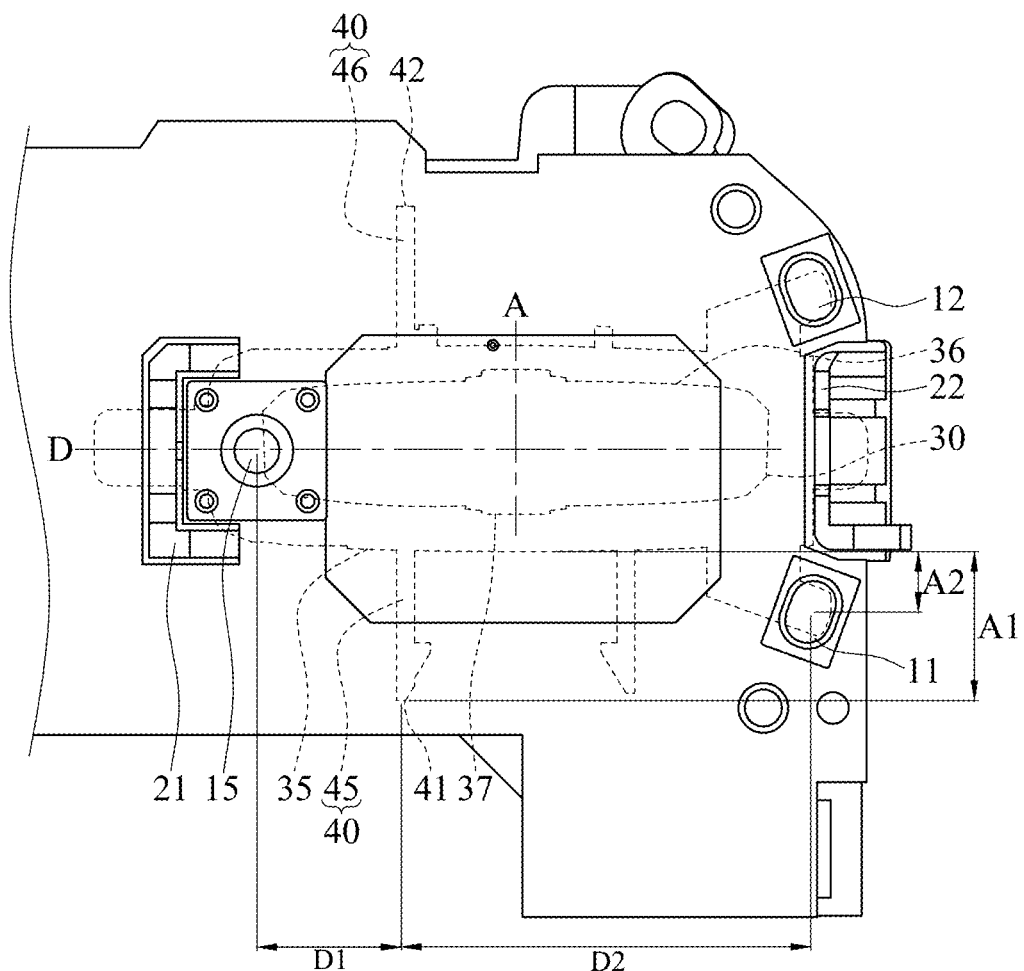
FIG. 10 illustrates a top view of the roller input device of the first embodiment of the instant disclosure.

FIG. 10 illustrates a top view of the roller input device of the first embodiment of the instant disclosure. The roller seat 30 shown in FIG. 10 is illustrated in a perspective manner, so that the relative positions among the click button switch 15, the first tilt button switch 11, and the second tilt button switch 12 can be seen from the figure. In this embodiment, the first stopping portion 41 is between the click button switch 15 and the first tilt button switch 11, and the distance between the first stopping portion 41 and the click button switch 15 is less than the distance between the first stopping portion 41 and the first tilt button switch 11. In other words, in this embodiment, as compared with the first tilt button switch 11, the first stopping portion 41 is nearer the click button switch 15 to perform better stopping and limiting performances. Likewise, the second stopping portion 42 is between the click button switch 15 and the second tilt button switch 12, and the distance between the second stopping portion 42 and the click button switch 15 is less than the distance between the second stopping portion 42 and the second tilt button switch 12. In other words, in this embodiment, as compared with the second tilt button switch 12, the second stopping portion 42 is nearer the click button switch 15 to perform better stopping and limiting performances.

Further, as shown in FIG. 10, the pivoting portion 37 of the roller seat 30 has a central axis A. In this embodiment, the direction of the central axis A is parallel to the axial direction of the roller 50 (as shown in FIG. 4), a first axial spacing A1 is between the first stopping portion 41 and the roller seat 30 along the central axis A, a second axial spacing A2 is between a central portion of the first tilt button switch 11 and the roller seat 30 along the central axis A, and the first axial spacing A1 is greater than the second axial spacing A2 (for example, the first axial spacing A1 is one or two times the second axial spacing A2). Therefore, when the first stopping portion 41 of the stopping member 40 swings along with the swinging of the roller seat 30, the stopping member 40 can perform better stopping and limiting performances. Likewise, the axial spacing between the second stopping portion 42 of the stopping member 40 and the roller seat 30 along the central axis A may be greater than the axial spacing between a central portion of the second tilt button switch 12 and the roller seat 30 along the central axis A.

As shown in FIG. 10, in this embodiment, the first tilt button switch 11 and the second tilt button switch 12 are at the same side of the central axis A, and the click button switch 15 and the first tilt button switch 11 are respectively at two opposite sides of the central axis A. The first stopping portion 41 of the stopping member 40 is between the click button switch 15 and the first tilt button switch 11, the second stopping portion 42 of the stopping member 40 is between the click button switch 15 and the second tilt button switch 12, and the first stopping portion 41, the second stopping portion 42, and the click button switch 15 are at the same side of the central axis A.

Further, as shown in FIG. 10, in this embodiment, the roller seat 30 has a radial direction D perpendicular to the central axis A, a first radial spacing D1 is between the first stopping portion 41 of the stopping member 40 and the central portion of the click button switch 15 along the radial direction D, a second radial spacing D2 is between the first stopping portion 41 of the stopping member 40 and the central portion of the first tilt button switch 11 along the radial direction D, and the first radial spacing D1 may be one-second or one-third of the second radial spacing D2. Moreover, the second stopping portion 42 of the stopping member 40, the click button switch 15, and the second tilt button switch 12 may have similar spacing relationships, and descriptions are thus not repeated here.

In some embodiments, as an option, the stopping member 40 may be detachably assembled on the roller seat 30. Therefore, the user can have the roller input device 1 to have the stopping members 40 having different shapes or sizes according to different product demands. Moreover, the position of the stopping member 40 may be adjusted with respect to the roller seat 30, so that the user can adjust the magnitude of the first initial spacing S1 and the second initial spacing S2 in accordance with the assembling tolerances. Descriptions are provided as below with accompanied drawings.

Figure 11:
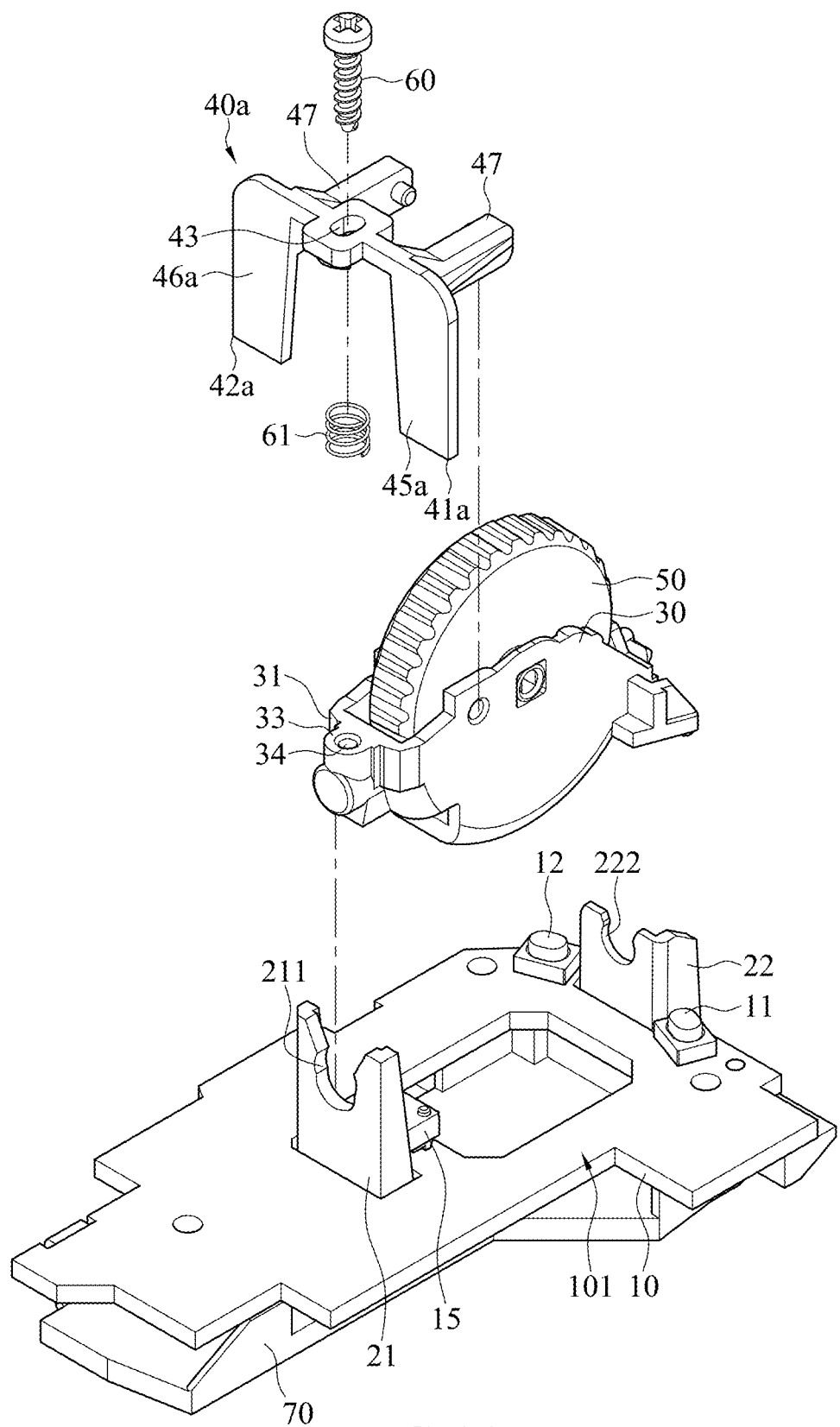
FIG. 11 illustrates an exploded view of a roller input device according to a second embodiment of the instant disclosure.
Figure 12:
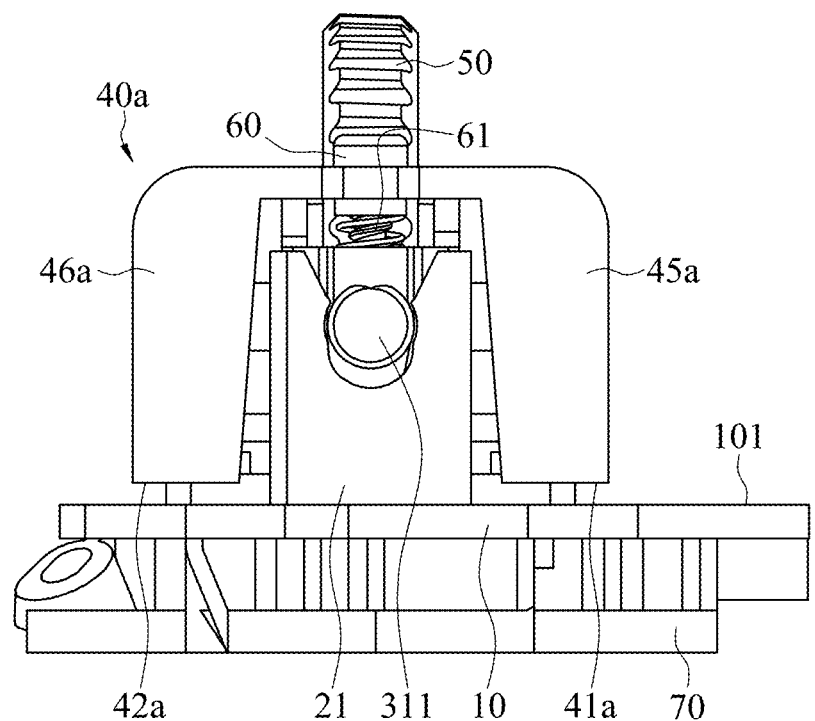
FIG. 12 illustrates a side view of the roller input device of the second embodiment of the instant disclosure.
Figure 13:
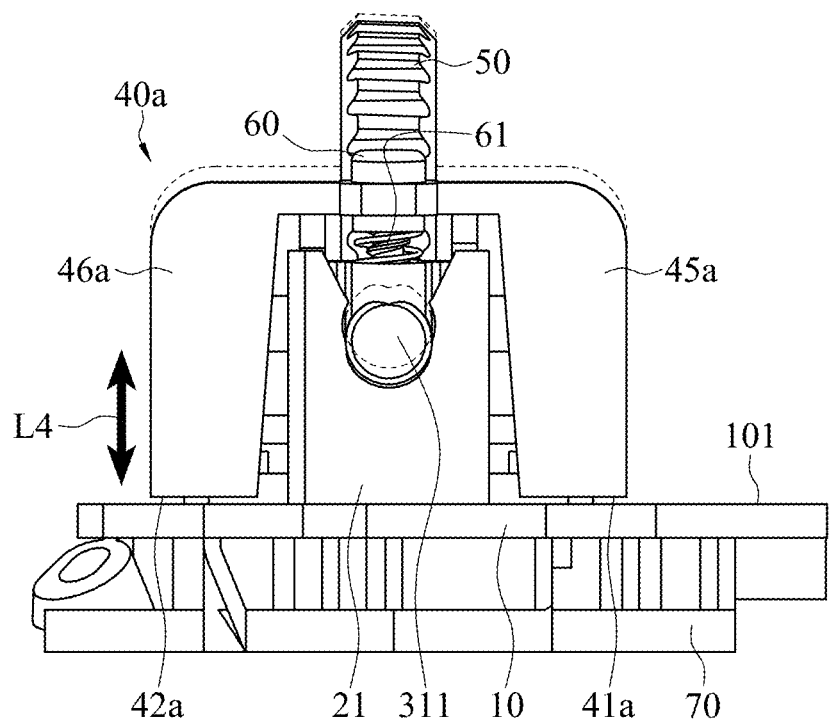
FIG. 13 illustrates a schematic view showing the adjustment of the roller input device of the second embodiment of the instant disclosure.

FIG. 11 illustrates an exploded view of a roller input device according to a second embodiment of the instant disclosure. FIG. 12 illustrates a side view of the roller input device of the second embodiment of the instant disclosure. FIG. 13 illustrates a schematic view showing the adjustment of the roller input device of the second embodiment of the instant disclosure. As shown in FIG. 11 and FIG. 12, the difference between the first embodiment and the second embodiment at least lies in that, in this embodiment, the first end 31 of the roller seat 30 further has an assembling portion 33, the assembling portion 33 has a screw hole 34, the stopping member 40a is a bracket assembled on the roller seat 30. The stopping member 40a has a through hole 43, the through hole 43 is assembled with an adjustment screw 60, the adjustment screw 60 is threaded with the screw hole 34. The assembling portion 33 is provided with an elastic member 61, and the elastic member 61 abuts against the stopping member 40a, where the elastic member 61 may be a spring, an elastic piece, an elastic rubber, or the like.

Further, as shown in FIG. 12 and FIG. 13, the first plate member 45a and the second plate member 46a of the stopping member 40a are also at two opposite sides of the roller seat 30. Moreover, the first stopping portion 41a of the first plate member 45a is adjacent to the top surface 101 of the substrate 10, and the second stopping portion 42a of the second plate member 46a is adjacent to the top surface 101 of the substrate 10. Hence, when the user operates the adjustment screw 60 to rotate, the stopping member 40a can move upward or downward with respect to the roller seat 30 (as indicated by the arrow L4 shown in FIG. 13), so that the height of the stopping member 40a can be adjusted. Accordingly, to meet the assembling tolerance or different product demands, the spacing between the first stopping portion 41a of the stopping member 40a and the substrate 10 and the spacing between the second stopping portion 42a of the stopping member 40a and the substrate 10 can be adjusted.

Further, as shown in FIG. 11, in this embodiment, the stopping member 40a comprises at least one extension arm 47 (in this embodiment, the stopping member 40a comprises two extension arms 47). One end of each of the extension arms 47 is pivotally connected to the roller seat 30. Therefore, when the user operates the adjustment screw 60 to rotate, the stopping member 40a can swing upward or downward with respect to the roller seat 30.

Figure 14:
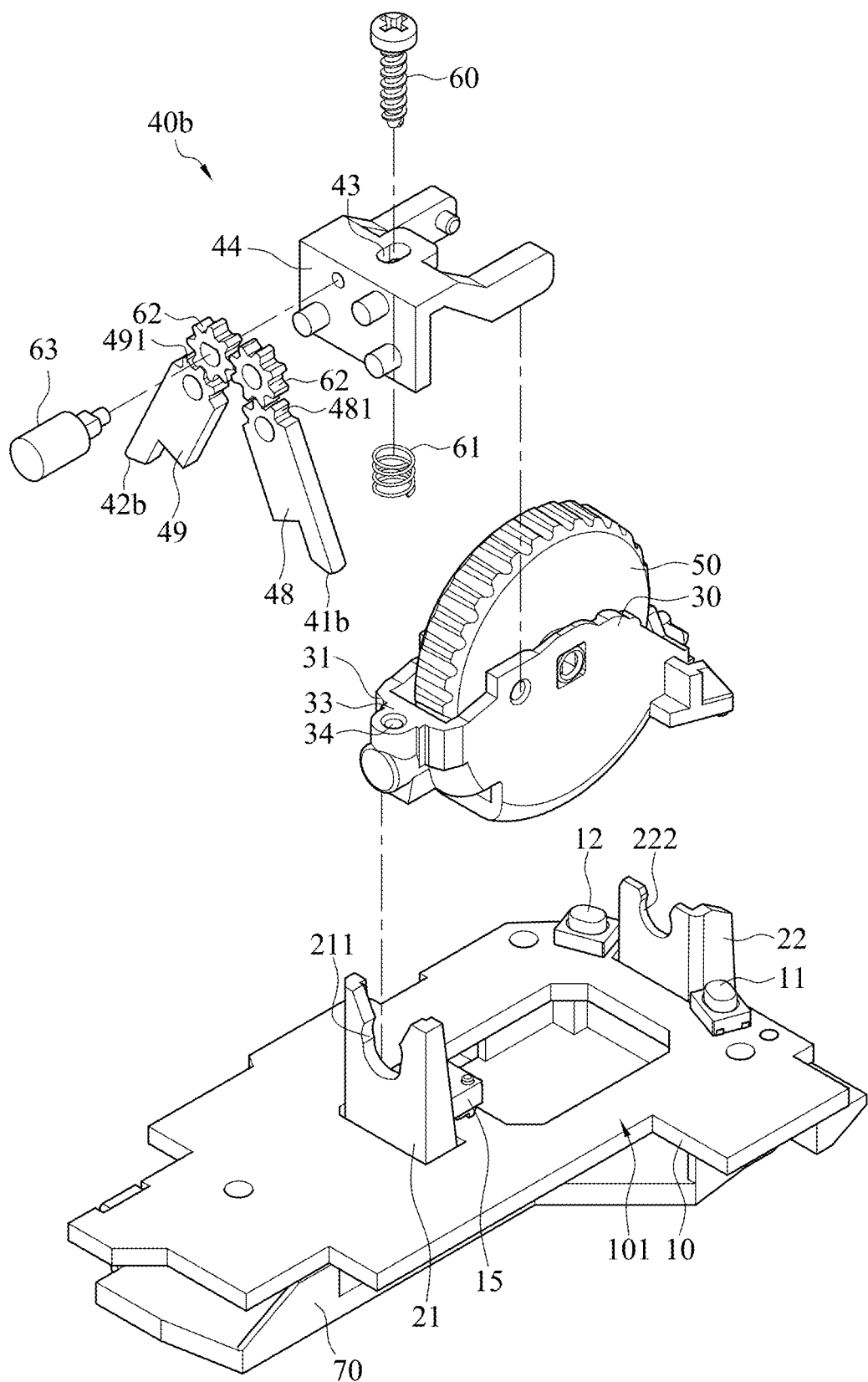
FIG. 14 illustrates an exploded view of a roller input device according to a third embodiment of the instant disclosure.
Figure 15:
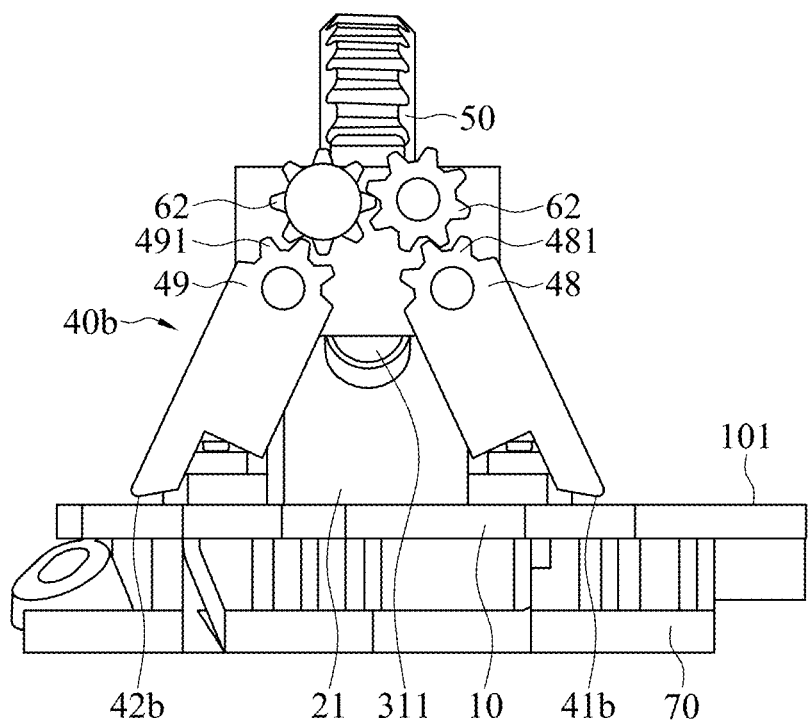
FIG. 15 illustrates a side view of the roller input device of the third embodiment of the instant disclosure.
Figure 16:
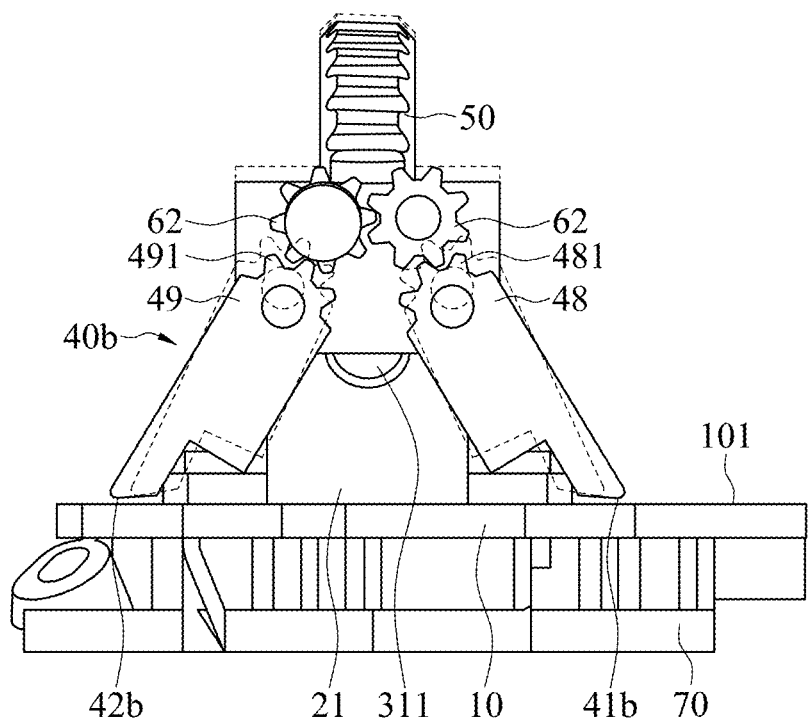
FIG. 16 illustrates a schematic view showing the adjustment of the roller input device of the third embodiment of the instant disclosure.

FIG. 14 illustrates an exploded view of a roller input device according to a third embodiment of the instant disclosure. FIG. 15 illustrates a side view of the roller input device of the third embodiment of the instant disclosure. FIG. 16 illustrates a schematic view showing the adjustment of the roller input device of the third embodiment of the instant disclosure. As shown in FIG. 14 and FIG. 15, this embodiment is identical to the second embodiment at least in that, in this embodiment, the first end 31 of the roller seat 30 also has an assembling portion 33 and a screw hole 34, the stopping member 40a comprises a bracket 44, the bracket 44 has a through hole 43, the adjustment screw 60 is assembled with the through hole 43 and threaded with the screw hole 34 of the roller seat 30, and the elastic member 61 abuts against the bracket 44 of the stopping member 40b. Accordingly, the user can adjust the height position of the roller seat 30 through the adjustment screw 60.

As shown in FIG. 14 and FIG. 15, the difference between the second embodiment and the third embodiment at least lies in that, in this embodiment, the stopping member 40b further comprises a first swing arm 48, a second swing arm 49, and at least one adjustment gear 62 (in this embodiment, the stopping member 40b comprises two adjustment gears 62). The two adjustment gears 62 are engaged with each other and rotatably connected to the roller seat 30, and the first swing arm 48 and the second swing arm 49 are respectively connected to the two adjustment gears 62. In this embodiment, the two adjustment gears 62 are rotatably connected to the bracket 44 and indirectly connected to the roller seat 30 through the bracket 44. One of two ends of the first swing arm 48 has a tooth portion 481, the tooth portion 481 is engaged with one of the two adjustment gears 62, and the first stopping portion 41b is at the other end of the first swing arm 48 and adjacent to the top surface 101 of the substrate 10. One of two ends of the second swing arm 49 has a tooth portion 491, the tooth portion 491 is engaged with the other one of the two adjustment gears 62, and the second stopping portion 42b is at the other end of the second swing arm 49 and adjacent to the top surface 101 of the substrate 10.

Therefore, as shown in FIG. 14 and FIG. 16, the user can operate one of the two adjustment gears 62 to rotate by using an operating member 63 to drive the first swing arm 48 and the second swing arm 49 to swing. Accordingly, to meet the assembling tolerance or different product demands, the spacing between the first stopping portion 41b of the stopping member 40b and the substrate 10 and the spacing between the second stopping portion 42b of the stopping member 40b and the substrate 10 can be adjusted.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A roller input device comprising:
   a substrate having a top surface, wherein the top surface is provided with a click button switch and a first tilt button switch, the click button switch has a click pressing stroke, and the first tilt button switch has a first pressing stroke;
   a bracket assembly disposed on the substrate, wherein the bracket assembly comprises a first bracket and a second bracket arranged apart from each other;
   a roller seat disposed on the substrate and between the first bracket and the second bracket, wherein the roller seat has a first end and a second end opposite to the first end, the first end is liftably and pivotally connected to the first bracket, the second end is pivotally connected to the second bracket, the click button switch is adjacent to the first end, and the roller seat selectively moves downward to a pressing position or swings to a first tilt position along a first side direction; and
   a stopping member connected to the roller seat, wherein the stopping member has a first stopping portion, the first stopping portion and the first tilt button switch are at one side of the roller seat, and a first initial spacing is between the first stopping portion and the top surface of the substrate;
   wherein when the roller seat is at the pressing position, the roller seat presses and triggers the click button switch, so that the first initial spacing is reduced to a first spacing, and the first spacing is less than the first pressing stroke of the first tilt button switch; when the roller seat is at the first tilt position, the roller seat presses and triggers the first tilt button switch, so that the first initial spacing is reduced to a second spacing, and the second spacing is less than the click pressing stroke of the click button switch.

2. The roller input device according to claim 1, wherein the stopping member is integrally connected to the roller seat.

3. The roller input device according to claim 2, wherein the stopping member comprises a first plate member extending from a first side surface of the roller seat, the first plate member has a first bottom surface facing the substrate, and the stopping portion is at one end of the first bottom surface away from the first side surface.

4. The roller input device according to claim 1, wherein a distance between the first stopping portion and the click button switch is less than a distance between the first stopping portion and the first tilt button switch.

5. The roller input device according to claim 1, wherein the first tilt button switch is adjacent to the second end of the roller seat.

6. The roller input device according to claim 1, wherein the roller seat has a pivoting portion adapted to be pivotally connected to a roller, the pivoting portion has a central axis, a first axial spacing is between the first stopping portion and the roller seat along the central axis, a second axial spacing is between the first tilt button switch and the roller seat along the central axis, and the first axial spacing is greater than the second axial spacing.

7. The roller input device according to claim 1, further comprising:
   a second tilt button switch, wherein the second tilt button switch and the first tilt button switch are respectively at two opposite sides of the roller seat, and the second tilt button switch has a second pressing stroke;

wherein the stopping member has a second stopping portion, the second stopping portion and the second tilt button switch are at one side of the roller seat, and a second initial spacing is between the second stopping portion and the top surface of the substrate;

wherein the roller seat further selectively swings to a second tilt position along a second side direction opposite to the first side direction, when the roller seat is at the second tilt position, the roller seat presses and triggers the second tilt button switch, so that the second initial spacing is reduced to a third spacing, and the third spacing is less than the click pressing stroke of the click button switch.

8. The roller input device according to claim 1, wherein the stopping member is detachably assembled on the roller seat.

9. The roller input device according to claim 1, wherein the stopping member is selectively moved with respect to the roller seat to adjust the first initial spacing.

10. The roller input device according to claim 9, wherein the roller seat has an assembling portion, the assembling portion has a screw hole, the stopping member has a through hole, the through hole is assembled with an adjustment screw, the adjustment screw is threaded with the screw hole, the assembling portion is provided with an elastic member, and the elastic member abuts against the stopping member.

11. The roller input device according to claim 10, wherein the stopping member comprises an extension arm, and one end of the extension arm is pivotally connected to the roller seat.

12. The roller input device according to claim 9, wherein the roller seat is further connected to an adjustment gear, the stopping member comprises a first swing arm, one of two ends of the first swing arm has a tooth portion, the tooth portion is engaged with the adjustment gear, and the first stopping portion is at the other end of the first swing arm.

* * * * *